United States Patent
Hoyer et al.

(10) Patent No.: US 7,021,082 B2
(45) Date of Patent: Apr. 4, 2006

(54) METHOD AND APPARATUS FOR SUPPRESSING OXYGEN BUBBLE FORMATION IN GLASS MELTS

(75) Inventors: Patrick Hoyer, Groebenzell (DE); Gernot Roeth, Dalheim (DE); Klaus-Dieter Duch, Taunusstein (DE); Fritz Kraemer, Klein-Winternheim (DE); Thomas Pfeiffer, Ingelheim (DE); Franzo Ott, Mitterteich (DE)

(73) Assignee: Schott AG, Mainz (DE)

( * ) Notice: Subject to any disclaimer, the term of this patent is extended or adjusted under 35 U.S.C. 154(b) by 153 days.

(21) Appl. No.: 09/945,601

(22) Filed: Sep. 4, 2001

(65) Prior Publication Data
US 2002/0026811 A1 Mar. 7, 2002

(30) Foreign Application Priority Data
Sep. 4, 2000 (DE) ........................ 100 43 454

(51) Int. Cl.
*C03B 5/225* (2006.01)
*C03B 5/24* (2006.01)

(52) U.S. Cl. ................... 65/134.9; 65/29.12; 65/135.6; 65/135.7; 65/160; 65/356

(58) Field of Classification Search ............... 65/29.12, 65/29.18, 134.9, 135.7, 160, 356, 29.16, 65/900, 135.8, 135.6; 373/36.39
See application file for complete search history.

(56) References Cited

U.S. PATENT DOCUMENTS

| 3,387,961 | A | | 6/1968 | Buehl et al. | |
|---|---|---|---|---|---|
| 4,549,895 | A | * | 10/1985 | Izumitani et al. | ........... 65/29.21 |
| 4,603,980 | A | * | 8/1986 | Berg | ........................ 374/179 |

(Continued)

FOREIGN PATENT DOCUMENTS

| DE | 3811864 A1 | * | 10/1989 |
|---|---|---|---|
| DE | 39 06 270 C2 | | 12/1994 |
| DE | 198 22 437 C1 | | 7/1999 |
| DE | 199 55 827 A1 | | 6/2001 |
| JP | 2001-172024 | * | 6/2001 |
| WO | 98/18731 | | 5/1998 |

OTHER PUBLICATIONS

Machine translation of JP 2001172024 retrived from www.j-po.go on Jun. 28, 2003.*
L.R. Velho et al: "Diffusivity and Solubility of Oxygen in Plantinum and . . . " Mettalurgical Transactions, vol. 3, Jan. 1972, pp. 65–71.
TH. Frey et al: "Glastechnische Berichte" 53, 1980, pp. 116–123.
"Measurements of Standard Seebeck Coefficients . . . " by Baucke and Muecke, Journal of Non–Crystalline Solids 84, 1986, pp. 174–182.
"The Role of Mechanical Properties in Low–Stress Fatigue . . . " by Hickerson and Hertzberg, Metallurgical Transactions, vol. 3, Jan. 1972, pp. 179–189.

(Continued)

*Primary Examiner*—Steven P. Griffin
*Assistant Examiner*—Carlos Lopez
(74) *Attorney, Agent, or Firm*—Michael J. Striker

(57) ABSTRACT

In the method of making glass a glass melt is formed from starting materials in a melt apparatus, which includes at least one metal part having a metal surface in contact with the glass melt in a first region of the glass melt having a predetermined oxygen partial pressure. This method includes suppressing oxygen bubble formation in the glass melt at a contacting surface between the metal surface and the glass melt; immersing an electrode in a second region of the glass melt not including the first region, which has a lower oxygen partial pressure than in the first region, and electrically conductively connecting the electrode and the at least one metal part. An apparatus for performing the method is also described as well as glasses made by the method.

21 Claims, 3 Drawing Sheets

U.S. PATENT DOCUMENTS

| | | | | |
|---|---|---|---|---|
| 4,929,266 A | * | 5/1990 | Cozac et al. | 65/134.5 |
| 5,071,528 A | * | 12/1991 | Baucke et al. | 205/783.5 |
| 5,509,951 A | * | 4/1996 | Baucke et al. | 65/134.6 |
| 5,580,439 A | * | 12/1996 | Baucke et al. | 205/782 |
| 5,785,726 A | * | 7/1998 | Dorfeld et al. | 65/134.1 |
| 5,964,913 A | * | 10/1999 | Titov et al. | 65/135.6 |
| 6,339,610 B1 | * | 1/2002 | Hoyer et al. | 373/32 |
| 6,422,041 B1 | * | 7/2002 | Simpson et al. | 65/134.4 |
| 6,629,437 B1 | * | 10/2003 | Baucke et al. | 65/134.9 |
| 2002/0112507 A1 | * | 8/2002 | Natermann | 65/134.1 |

OTHER PUBLICATIONS

Platinum Electrodes and Calcia–Stabilized Zirconia: by R.J. Brook, et al, Journal of the Electrochemical Society, Electrochemical Science, Feb. 1971, pp. 185–192.

"An Electrochemical Theory for Oxygen Reboil", J.H. Cowan. et al, Journal of the Americal Ceramic Society—Johnston and Chelko, vol. 49, No. 10, pp. 559–562.

"Der Einbau Des Wassers in Glaesern" by Horst Scholze, Glasstechnische Berichte 32, 1959, pp. 142–152.

* cited by examiner

METHOD AND APPARATUS FOR SUPPRESSING OXYGEN BUBBLE FORMATION IN GLASS MELTS

BACKGROUND OF THE INVENTION

1. Field of the Invention

The present invention relates to a method for the suppression of oxygen bubbles at noble metal parts, which are present in a glass melt during the making of glass, to a means for suppression of the oxygen bubbles in the glass melt, to a method and apparatus for making glass in which formation of oxygen bubbles in the glass melt is suppressed and to the uses of the glasses obtained by this method.

2. Description of the Related Art

Various chemical and physical processes occur in the melt during the melting of starting materials for manufacture of glass besides the melting process. Both crystallization water and also $CO_2$ and, if present, $SO_2$, which dissolve in the glass melt until it is saturated, are released and are separated as fine bubbles. These gas bubbles are then removed during further processing, which happens for example during chemical refining, which produces gaseous oxygen. These oxygen bubbles well up or rise from the low-viscosity melt. The partial pressure of gases, which are produced in the melt, such as $CO_2$, CO, $N_2$, $NO_x$, is initially equal to zero in these bubbles. But then the dissolved gases diffuse from the melt into the oxygen bubbles. Also the fine gas bubbles formed from the above-mentioned gases by exceeding the saturation limit coalesce or merge with these oxygen bubbles. These latter bubbles are thus larger and are advantageously more energetic than the smaller bubbles because of their small surface tension. As a result there is always no equilibrium between the large and small bubbles, until the contents of the small bubbles have been released by the bubble merging process or by diffusion. The large bubbles then rapidly rise because of their increased buoyancy and release their contents to the gas atmosphere over the melt. This process is also designated as refining or bubble removal.

The desired production of oxygen bubbles during refining, which can easily rise in the low viscosity melt in this process step, is however unwanted in other processing steps of the glass manufacture. Small microscopic bubbles in the glass lead to a poorer quality final product that has inferior mechanical and optical properties. Gas bubbles are especially undesirable in the so-called conditioning or cooling zone and completely unwanted in the feed channel.

Furthermore in the cooling or conditioning region, especially in the feed channel, the thickness or the height of the glass melt is no longer as large and thus the hydrostatic pressure in the bottom portion of the melt decreases, which leads to growth of the eventually present gas bubbles. German Patent Application DE-A 198 22 437 suggests that a sufficient pressure for suppression of smaller bubbles should be applied to the melt.

Water is built into the $SiO_2$ network of a glass melt in the form of OH groups and hydrogen bonds to the extent that water is soluble in glass, as described, for example, in H. Scholze, in *Glastechnische Berichte* [*Glass Technology Reports*], 32, pp. 142–152 (1959). Water, in this dissolved form, causes no disadvantageous properties in the finished glass product.

At the process temperature of the glass melt water is usually partially split into its components, hydrogen and oxygen. At a process temperature of 1500° C., for example, the portion of water dissociated or split is 0.2%.

A large majority of the currently used apparatuses for making glass have noble metal, especially platinum clad, parts. Undesirable $O_2$-bubble formation occurs immediately on these noble metal parts, especially in the feed duct. A theoretical model is, for example, described in J. M. Cowan, et al, in *J. of the American Ceramic Society*, Vol. 49, pp. 559–562 (1966). Accordingly an electrical potential difference, whose size depends on the composition of the melt and is approximately between 30 mV/100° C. and 100 mV/100° C., arises in a glass melt because of the presence of a temperature gradient. If the hot and the cold regions are shorted out by means of a bridge of platinum wire, oxygen bubbles arise on the wire in the hot region. This bubble formation is a result of the short circuit current flowing in the platinum wire. New experiments at Schott Glas have shown that oxygen bubbles can also occur at the cold electrode during electrical short circuiting of non-isothermal melts (see F. G. K. Baucke, K. Mücke: "Measurement of standard Seebeck coefficients in nonisothermal glass melts by means of $ZrO_2$ electrodes", *J. Non-Cryst. Solids* 84, 174–182 (1986)). Where the bubbles occur, depends entirely on the composition of the melt.

Additional experiments have shown that that there are two additional causes of oxygen bubble formation besides the above-described short-circuiting thermal voltages, namely alternating current electrolysis (rectified component of the thermal alternating current) and the decomposition of water present in the melt at the melt-platinum boundary surface. As far as damage goes, this latter effect exceeds all others by a wide margin.

A method for prevention of special oxygen bubbles, which are produced by the above-described thermal decomposition of water present in the glass melt into oxygen and hydrogen and diffusion away of hydrogen, is described in WO 98/18731. In this method the bubble formation is avoided because the diffusion of hydrogen is prevented by incandescent or glowing platinum or molybdenum walls. A greater partial pressure of hydrogen builds up on the rear side of the platinum, which is sufficient for preventing or compensating a migration of the hydrogen formed according to the above-described decomposition reaction through the platinum wall. The enrichment of the melt with oxygen, which cannot pass through the platinum lining, is thus prevented in this way. This process however presupposes expensive structural modifications, since the corresponding regions of the production plant for glass must be reconstructed so that the platinum lining is washable with a hydrogen-containing gas. This means that the platinum parts must be provided with a jacket or casing, which is resistant to temperatures up to about 350° C., is air-tight and has insulated electrical ducts for the heating elements and conductors for electric heating of the platinum components. This is complicated and expensive to make.

A method for melting, particularly for reducing glass, is described in DE-C-3 906 270, in which a melt vessel clad with platinum is protect against corrosion. A protective glass layer, which is rich in oxygen, is produced on the crucible or vessel inner surfaces, since the side of the crucible or vessel facing away from the glass is rinsed with oxygen. This phenomenon was believed to be due to the penetration of a platinum wall or body at a sufficiently high temperature and at sufficiently high oxygen partial pressure by oxygen according to the teachings in L. R. Velho and R. W. Bartlett in *Metallurg. Trans.* 3, p. 65 (1972) and R. J. Brook, et al, in *J. Electrochem. Soc.* 118, p. 185 (1971). According to the knowledge obtained in the making of the present invention this prior art method is based on the oxygen enrichment cause by diffusion away of hydrogen through the platinum wall, not on the oxygen diffusion through platinum.

SUMMARY OF THE INVENTION

In an additional published patent application P 199 55 827, whose description is expressly incorporated herewith and which contains the same subject matter as U.S. Pat. No. 629.437 B1, it is taught that oxygen bubble formation may be prevented, when a potential drop is produced between the noble metal lining and/or jacket and the noble metal part, at which the oxygen bubble formation is not desired, and an electrode immersed in another region of the glass melt. This preferably happens by means of a direct current voltage source, whose minus pole is connected with the noble metal part and/or jacket and whose positive pole is connected with the electrode.

It is an object of the present invention to provide an improved method for preventing or suppressing the usually non-electrically induced oxygen bubble formation.

It is an additional object of the present invention to provide a device for performing the improved method for preventing or suppressing the usually non-electrically induced oxygen bubble formation.

It is a further object of the present invention to provide a method and apparatus for making glass from a glass melt in a melt apparatus in which oxygen bubble formation in the glass melt is suppressed.

It is another object of the present invention to prepare improved glass products, which are obtained using the method and/or apparatus according to the invention.

According to the invention the method of making glass includes the steps of:

a) forming a glass melt from starting materials in a melt apparatus comprising at least one metal part having a metal surface in contact with the glass melt in a first region of the glass melt, a predetermined oxygen partial pressure existing in the first region of the glass melt;

b) suppressing oxygen bubble formation in the glass melt at a contacting surface between the metal surface and the glass melt;

c) immersing an electrode in a second region of the glass melt that is separated from the first region, a lower oxygen partial pressure existing in this second region than in the first region at the contacting surface, at which the oxygen bubble formation is suppressed in step b); and d) electrically conductively connecting the electrode and the at least one metal part.

According to the invention oxygen bubble formation on metal parts, especially on noble metal parts, of the vessel lining or jacket, especially in the cooling or conditioning zone, may be entirely avoided or suppressed, when the electrode is immersed in the second region of the glass melt, in which a lower oxygen partial pressure exists than in the first region in which the oxygen bubble formation is to be avoided. This electrode is electrically conductively connected with the metal, especially noble metal, lining or jacket of the region, in which the oxygen bubble formation is not desired. The procedure according to the invention suppresses oxygen bubble formation, since the molecular oxygen inclined to form bubbles that is present, according to the equation:

is converted into oxygen anions. The oxygen anions produced dissolve in the glass melt in almost any amount. Oxygen, which would otherwise produce bubbles, is thus removed independently of its origin.

Preferably the electrode is immersed in the melt in a region, in which the oxygen gas bubbles are not harmful, for example in the melting region or in the refining chamber. In a preferred embodiment of the invention the electrodes are especially close to the surface of the glass melt, so that oxygen bubbles eventually arising there have only short distance to rise to the glass surface and are released there or so that they collect at the surface and can be mechanically stripped or removed from the surface. In an especially preferred embodiment the electrode is a part of the glass melt apparatus, such as a pan, a rod, a pipe, a stirring element, a needle, a heating electrode, a nozzle and a bar.

A sufficiently conductive electrical cable with reduced ohmic resistance usually provides the electrically conductive connection of the metal, especially noble metal, lining or jacket with the electrode. Electrical insulation from the remaining component parts that are in contact with the melt must be provided. In special cases however it is also possible to use parts of the glass manufacturing apparatus as electrically conductive connections, in so far as they do not lead to short circuits in the system and in so far as these parts have no electrical contact with the metal, except via the electrode and the metal and/or noble metal lining or jacket.

The electrode is coated or clad with a metal, preferably a noble metal, on its side facing the glass melt, so that it can fulfill its purpose. Preferably the metal lining of the electrode immersed in the melt has a surface, which amounts to at least 25 percent of the contacting surfaces of the glass melt and the metal coating or lining of the part, on which the oxygen bubble formation should be avoided. Although the metal of the electrode lining or coating usually is the same metal as that of the part on which the oxygen forms, it has proven significant in a few cases to change the electrode potential by selection of another suitable metal.

Preferably the metal lining or coating, on which the oxygen bubble formation should be suppressed, is electrically insulated from other metal parts, and of course especially from those metal parts, at which the oxygen partial pressure is higher. Appropriately insulated regions are particularly the refining region, the feed channel and the fusing region. Furthermore the places, at which the gas bubble formation should be prevented, i.e. the metal lining and the glass melt contained in it usually have a lower temperature than the electrode and the glass melt surrounding it.

Preferably a lower oxygen partial pressure around the electrode is provided in the glass melt. This lower oxygen partial pressure can be produced in a number of different ways known to those skilled in art. For example in an especially preferred embodiment the electrode is formed as a hollow body. The surface or side of the metal jacket or shell around this electrode that faces away from the glass is rinsed with a reducing gas. The reducing gases that are preferred include hydrogen, water vapor or steam, forming gas or mixtures thereof. Preferably the thickness of the metal coating or jacket is comparatively thin and amounts usually to from 0.1 to 20 mm. A thickness of the metal coating or jacket of from 0.5 to 1.5 mm is especially preferred.

Preferably the metals for the lining or jacket of the electrode and/or the metal lining of the part, on which the oxygen bubble formation is to be prevented, are noble metals, including all metals of the platinum group, especially platinum itself and gold rhenium, molybdenum, tungsten and alloys thereof.

The rinsing of the electrode with reducing gas can be performed with any arbitrary gas pressure, preferably however with a pressure of from 1 or 1.001 to 5 bar, especially from 1.05 to 1.5 bar. Preferred flow rates amount to 0.01 to 200 l/min, especially 0.1 to 2 l/min per electrode.

It has been shown that hydrogen usually has a considerable leak rate from gasification apparatus, which is usually substantially higher than the actual consumption rate of hydrogen for the purposes of the invention. Because of this condition it is necessary to over-supply the rinsing gas so that the flow rate maintains or sets the hydrogen partial pressure in the interior of the apparatus.

When hydrogen is used, the concentration of hydrogen in the entire gas amounts to 0.001 to 50 percent, preferably from 0.01 to 2 percent. In many cases it has proven sufficient when the interior side of the metal coating of the electrode facing away from the glass is only acted on with an increased partial pressure of the reducing gas. A permanent rinsing of the electrode interior side is only necessary in order to balance the leakage loss.

According to the invention it has also been found that non-electrically induced oxygen bubble formation on noble metal parts only ceases when the glass is water-free or at least nearly water-free, i.e. contains no or only a few water molecules, and, indeed, no water molecules, which are built into the $SiO_2$ network as OH groups, as is described in the above-cited prior art reference by Scholz.

Generally oxygen bubbles also are generated by electrolysis of the glass melt itself, when thermal potential differences develop between the vessel parts with different temperatures or currents flowing because of concentration differences, in part caused by electrical additional heating. The oxygen molecules produced because of this effect dissolve as oxygen gas in the melt. Also in these cases the apparatus according to the invention has proven effective to suppress the oxygen bubble formation.

If the region, in which the gas bubble formation is to be avoided, preferably should be electrically insulated from other metal and/or noble metal coated regions of the glass melt apparatus, their electrical connection to the electrode is naturally avoided or taken out. Also the electrode itself is appropriately insulated from the noble metal lining of the melt vessel.

In an especially preferred embodiment of the invention the oxygen partial pressure in the gas melt is directly measured. These kinds of measurements are known and performed, for example, with probes as described by Th. Frey and F. G. K. Baucke, et al, in *Glastechn. Ber.* 53, pp. 116–123 (1980). In an especially preferred embodiment the oxygen partial pressure measured by means of this probe and/or the signal produced by it are used directly for control and regulation of the gas flow rates and/or partial pressures of the reducing gas used to rinse the electrodes. The oxygen partial pressure is preferably measured in the region, in which the oxygen formation should be suppressed. In individual cases however it is also possible to control the oxygen partial pressure and thus the gas rinsing by measuring the oxygen partial pressure in the vicinity of the electrode. It is most especially preferred to measure both the oxygen partial pressure in the region, in which the oxygen is unwanted and also in the region of the electrode itself. In this way measured voltages or potentials may be produced, by which rapid control of the oxygen content and thus the oxygen bubble formation in the finished glass is possible.

According to the invention the apparatus for making glass includes:

means for forming a glass melt from starting materials;

at least one metal part in contact with the glass melt in a first region of the glass melt;

means for suppressing oxygen bubble formation at the at least one metal part in contact with the glass melt in the first region of the glass melt;

an electrode arranged in a second region of the glass melt in which a lower oxygen partial pressure exists than in the first region of the glass melt; and an electrically conductive connection between the electrode and the at least one metal part.

Glasses made by the process according to the invention and/or the glass melt apparatus according to the invention, are especially suitable for monitors, liquid crystal displays (LCDs), thin film transistors (TFTs), television screens, optical lenses, household appliances, such as cooking vessels, microwave vessels, cooking units, electronic units, window glass, lamp glass and/or display glass.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
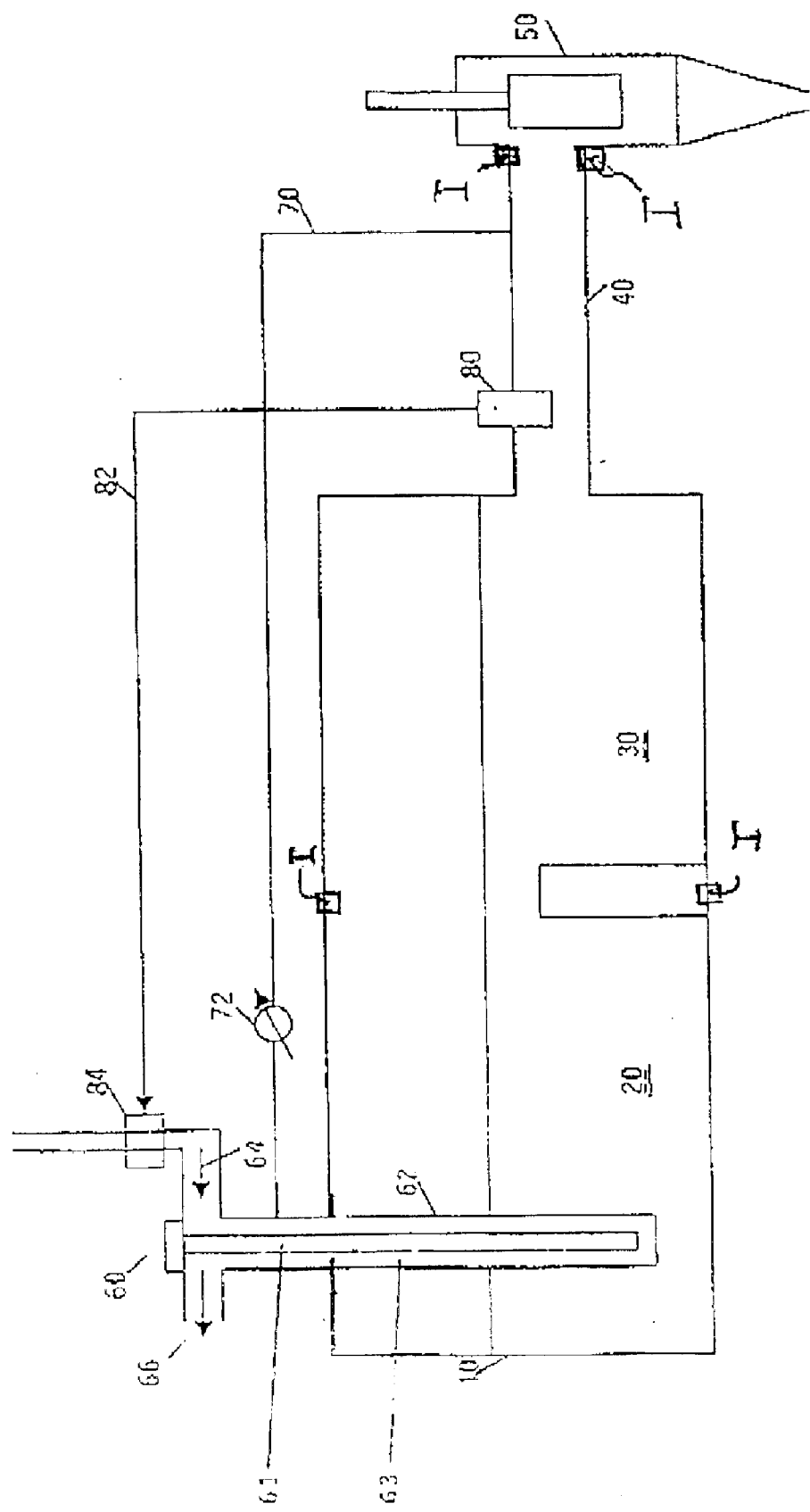
FIG. 1 is a schematic diagram of an apparatus according to the invention for making glass including means for suppressing formation of oxygen bubbles.

The apparatus according to the invention shown in FIG. 1 includes a melt vessel 10 lined with a preferably noble metal, which contains the glass melt 20 and includes, if necessary, a conditioning or cooling region 30. In this apparatus the glass melt 20 is conducted via a feed duct 40 to a stirred vessel 50. where the melted glass is dispensed from the apparatus. An electrode 60 rinsed with gas is immersed in the glass melt 20. This electrode 60 has an electrode core 61 and a platinum coating or jacket 62 around the electrode core. The platinum coating or jacket 62 is spaced from the electrode core 61, so that the intervening space 63 can be rinsed with gas. The intervening space 63 is in fluid communication with a gas inlet line 64 and a gas outlet line 66. The feed duct 40 and the electrode 60 acted on with the gas are connected and/or short circuited by means of an electrical connection 70. The feed duct 40 and the conditioning or cooling region 30 are insulated with insulation I from the remaining metal elements of the apparatus. It necessary the EMF between the electrode 60 and the feed duct 40 is measured by means of a detector 72.

A probe 80 for measuring the oxygen partial pressure is immersed in the melt in the vicinity of the feed duct 40. The probe is connected by means of a conductor 82 with a regulator 84 for the gas supply line 64. The regulator 84 controls or regulates the gas supplied through the gas inlet line 64 according to the oxygen partial pressure measured by the probe 80, whereby the EMF between the feed duct 40 and the electrode 60 may be controlled on-line. In principle, it is also possible to control the oxygen feed directly by means of the E.M.F. on-line according to the detector 72.

Figure 2:
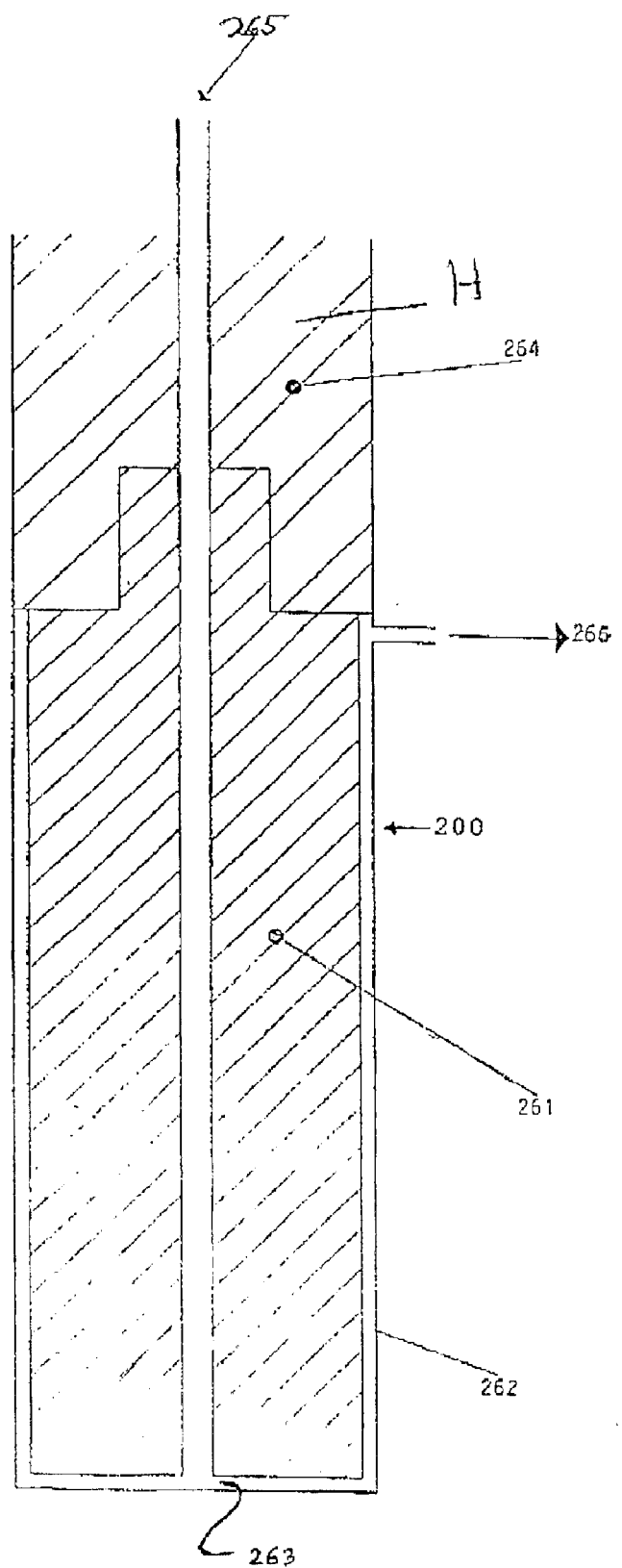
FIG. 2 is a simplified cross-sectional view through an electrode for the means for suppressing oxygen bubble formation shown in FIG. 1.

FIG. 2 shows the form of one embodiment of an electrode 200 acted on with gas. It includes an electrode holder 264 that is not dipped in the glass melt 20 and an electrode core 261 made from ceramic or metal material. The electrode core 261 is provided with a noble metal jacket 262 spaced from it. The spacing of the noble metal sleeve from the electrode core 261, especially a platinum metal jacket is sufficiently large so that it is rinsable with gas. A gas inlet line 265 ends in a gas chamber 263 formed between the electrode core 261 and the noble metal Jacket 262 spaced from it. A gas outlet 286 is arranged in the upper portion of the gas chamber 263. The gas outlet 266 can be arranged laterally and also as an outlet line through the electrode holder 264. The electrode holder 264 can also be a heating element, which is part of a lager heating device.

Figure 3:
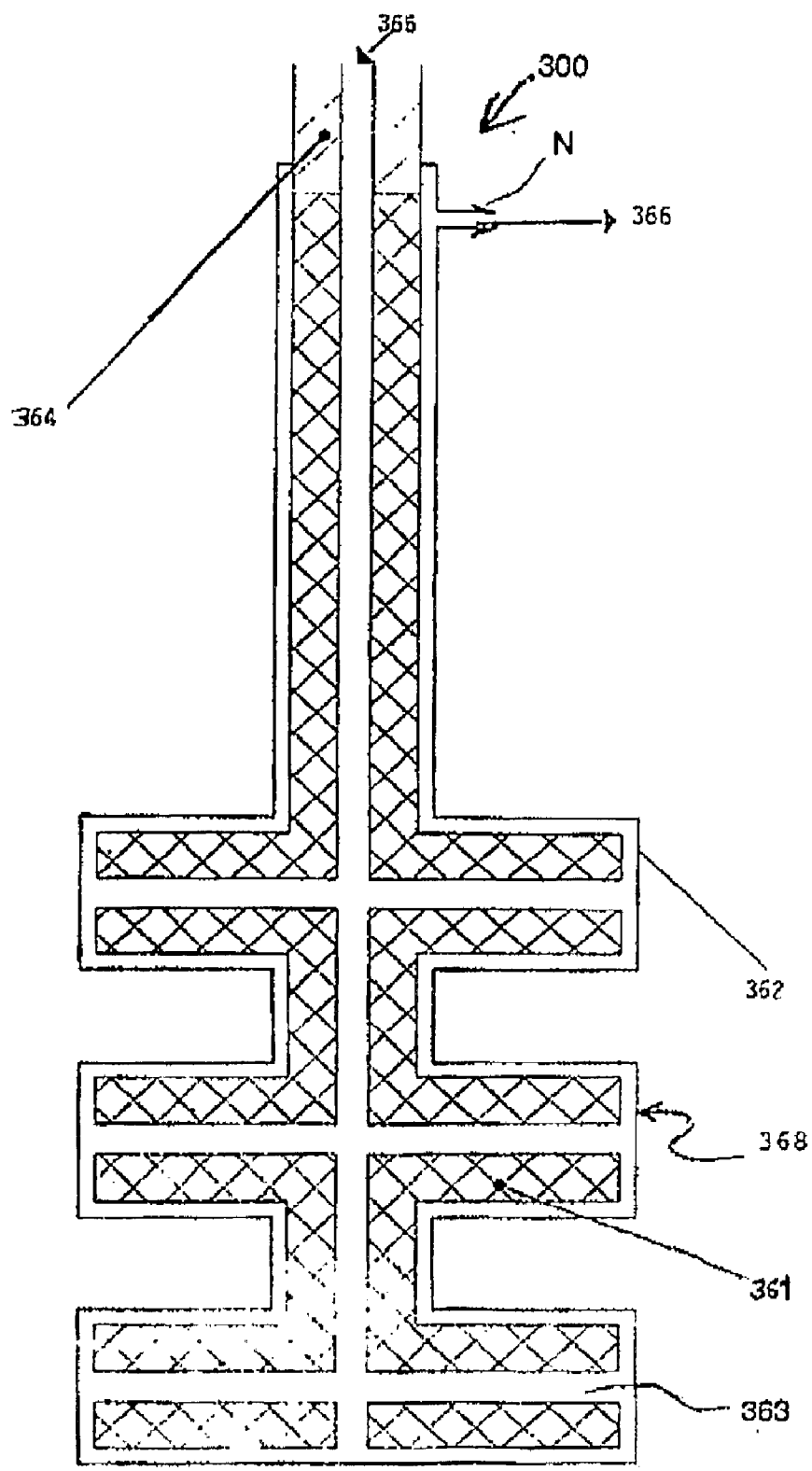
FIG. 3 is a diagrammatic cross-sectional view through a stirrer formed for use as an electrode in the process according to the invention.

FIG. 3 shows a stirrer 300 acting as an electrode, which can be rinsed with gas. The stirrer 300 includes a holder 364 and a stirring member 368connected with it, which includes a metal or ceramic core 361 provided with gas feed lines 365. The stirring member 368 is completely surrounded on its outer side by a noble metal sleeve 362. The intervening space 383 formed between the stirring core 381 and noble metal sleeve 362 is in fluid communication with the gas supply line 365. A gas outlet 366 for removal of the consumed gas and/or reaction products is located at the upper end of the stirring member 368. The gas outlet 366 may also include a nozzle N.

High quality glasses may be prepared in an easy manner with the method and apparatus according to the invention.

The disclosure in German Patent Application 100 43 454.1 of Sep. 4, 2000 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method for the suppression of oxygen bubbles at noble metal parts, which are in a glass melt in connection with glass manufacture, to an apparatus for suppression of the oxygen bubbles in the glass melt and to the uses of the glasses obtained by this method, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making glass, said method comprising the steps of:
    a) forming a glass melt from starting materials in a melt apparatus, said melt apparatus comprising at least one metal part having a metal surface in contact with the glass melt in a first region of the glass melt, a predetermined oxygen partial pressure existing in said first region;
    b) suppressing oxygen bubble formation in the glass melt at a contacting surface between the metal surface and the glass melt;
    c) immersing an electrode in a second region of the glass melt not including said first region, a lower oxygen partial pressure existing in said second region of the glass melt than said predetermined oxygen partial pressure in said first region at said contacting surface, at which the oxygen bubble formation is suppressed in step b);
    d) electrically conductively connecting the electrode and the at least one metal part; and
    e) rinsing said electrode with a reducing gas or a reducing gas mixture for reducing said oxygen partial pressure in said glass melt surrounding said electrode.

2. The method as defined in claim 1, wherein said reducing gas is at least one member selected from the group consisting of hydrogen, steam, water vapor, and forming gas.

3. The method as defined in claim 1, wherein said reducing gas mixture comprises at least one member selected from the group consisting of hydrogen, steam, water vapor and forming gas.

4. The method as defined in claim 1, further comprising generating an output signal from an oxygen probe that is a measure of said oxygen partial pressure in said first region of said melt and controlling partial pressure in the reducing gas or the reducing gas mixture for rinsing the electrode according to said output signal.

5. The method as defined in claim 1, wherein said glass is window glass, lamp glass or display glass.

6. A method of making a television screen or an optical lens, said method comprising the steps of:
    a) making glass according to the method of claim 1; and
    b) forming said television screen or said optical lens from said glass.

7. A method of making a monitor, a liquid crystal display, a thin film transistor or a household appliance, said method comprising the steps of:
    a) making glass according to the method of claim 1; and
    b) including said glass in said monitor, said liquid crystal display, said thin film transistor or said household appliance.

8. The method as defined in claim 1, wherein said at least one metal part is a noble metal part.

9. The method as defined in claim 1, wherein said at least one metal part comprises a metal lining, said metal lining provides a metal surface in contact with said glass melt at which said oxygen bubble formation is to be suppressed and said metal lining comprises at least one platinum group metal.

10. The method as defined in claim 1, wherein said electrode comprises a hollow body and an electrically conducting jacket for the hollow body and said electrically conducting jacket comprises at least one platinum group metal.

11. The method as defined in claim 10, wherein said at least one platinum group metal is selected from the group consisting of platinum and gold.

12. An apparatus for making glass, said apparatus comprising
    means for forming a glass melt from starting materials;
    at least one metal part in contact with the glass melt in a first region of the glass melt;
    means for suppressing oxygen bubble formation at said at least one metal part in contact with the glass melt in said first region of the glass melt;
    an electrode arranged in a second region of the glass melt in which a lower oxygen partial pressure exists than in the first region of the glass melt, said electrode comprising a hollow body and an electrically conducting jacket for the hollow body;

an electrically conductive connection between the electrode and the at least one metal part; and means for rinsing a rear surface of said electrically conducting jacket facing away from the glass melt with at least one reducing gas or at least one reducing gas mixture.

13. The apparatus as defined in claim 12, further comprising remaining electrically conducting parts and wherein the at least one metal part is electrically insulated from the remaining electrically conducting parts.

14. The apparatus as defined in claim 12, wherein said electrode comprises at least one member selected from the group consisting of a stirrer, a nozzle, a bar and a heating element.

15. The apparatus as defined in claim 12, wherein said electrically conducting jacket has a thickness of from 0.1 to 20 mm.

16. The apparatus as defined in claim 12, wherein said electrically conducting jacket comprises at least one noble metal.

17. The apparatus as defined in claim 12, wherein said electrically conducting jacket comprises at least one platinum group metal.

18. The apparatus as defined in claim 12, wherein said electrically conducting jacket comprises at least one noble metal and said at least one noble metal is selected from the group consisting of gold, tungsten, rhenium and molybdenum, or said at least one noble metal is an alloy of at least two of said gold, said tungsten, said rhenium and said molybdenum.

19. The apparatus as defined in claim 12, further comprising an oxygen probe for measuring the oxygen partial pressure in the glass melt in said first region and control means for controlling a partial pressure of the reducing gas at the electrode according to the oxygen partial pressure measured by the oxygen probe.

20. The apparatus as defined in claim 12, wherein said at least one metal part is a noble metal part.

21. The apparatus as defined in claim 12, wherein said at least one metal part comprises a metal lining, said metal lining provides a metal surface in contact with said glass melt at which said oxygen bubble formation is to be suppressed and said metal lining comprises at least one platinum group metal.

* * * * *